Sept. 6, 1938.  E. B. PERRINE  2,129,443

FISHING REEL

Filed April 4, 1938  2 Sheets-Sheet 1

Inventor:
Emmett B. Perrine
By Whiteley and Puckman
Attorneys

Sept. 6, 1938.  E. B. PERRINE  2,129,443
FISHING REEL
Filed April 4, 1938  2 Sheets-Sheet 2
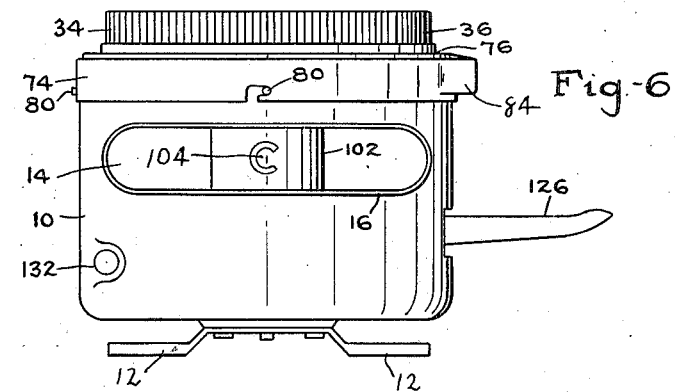
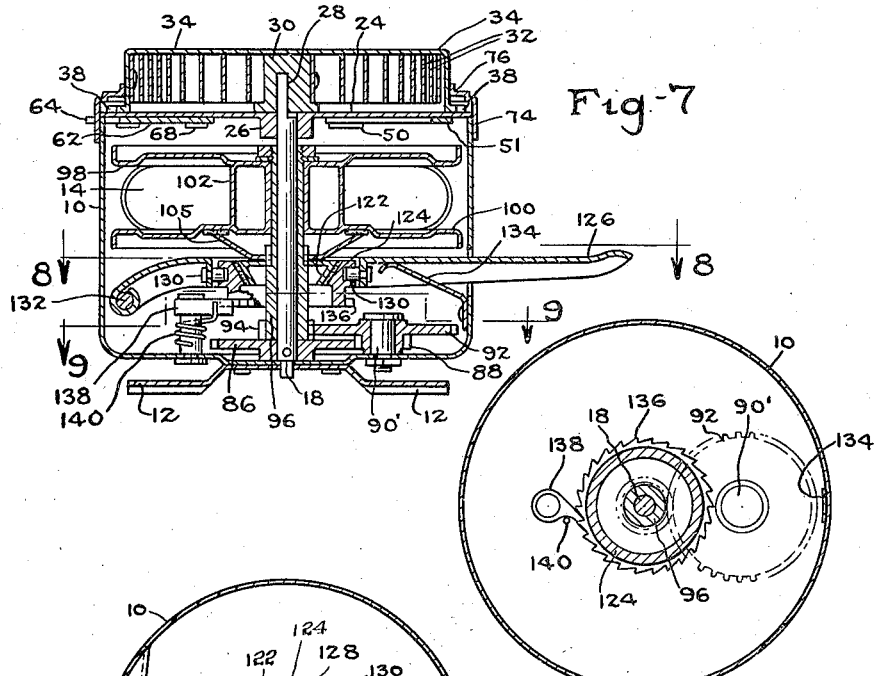
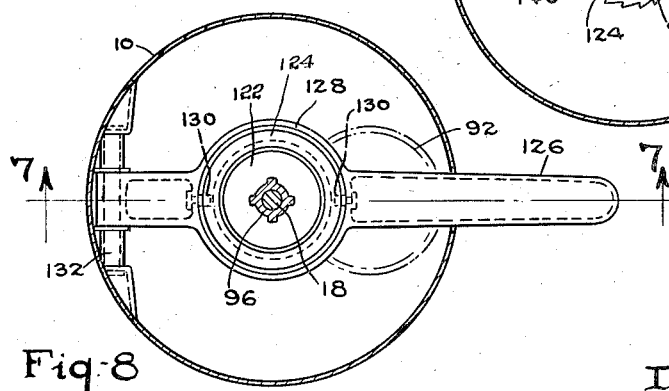
Inventor:
Emmett B. Perrine
By Whiteley and Ruckman
Attorneys Patented Sept. 6, 1938

2,129,443

UNITED STATES PATENT OFFICE 2,129,443

FISHING REEL

Emmett B. Perrine, Minneapolis, Minn.

Application April 4, 1938, Serial No. 199,766

9 Claims. (Cl. 242—84.5)

My invention relates to fishing reels and particularly to reels of the type in which a spool is actuated automatically for winding the line thereon under control of brake mechanism which permits the spool to have its wind-up action only when the brake is released manually. An object of the invention is to provide a device of this character which is simple, rugged, compact and durable in construction and which permits the line to be freely stripped from the spool. In devices of this character, when the spool is removed from the shell by inexperienced persons for cleaning or other purpose, difficulty is often experienced in putting the spool back in the shell in constructions where any adjustment or proper positioning of the brake mechanism is required. A particular object therefore of the invention is to provide a reel in which the spool may be removed freely from the shell without disturbing or disconnecting the brake mechanism whereby the spool may be restored without paying any attention to the brake mechanism so that the device is "fool-proof" in this respect.

I accomplish the objects of my invention by providing in combination, a line spool, a motor spring, driving means between the spring and spool, a rotatable member operating in connection with the driving means, a rotatable brake member concentrically mounted with relation to said rotatable member, means for preventing rotation of the brake member in the direction to wind the line on the spool, means normally holding the brake member in contact with the said first rotatable member, and hand operable means for removing said contact.

The full objects and advantages of my invention will appear in connection with the detailed description thereof, and the novel features of my inventive idea will be particularly pointed out in the claims.

In the accompanying drawings which illustrate two forms in which my invention may be embodied, Fig. 1 is an elevational view of one form of the device.

Fig. 6 is an elevational view of another form of the device.

Fig. 7 is a view in central vertical section on line 7—7 of Fig. 8.

Fig. 8 is a view in section on the line 8—8 of Fig. 7.

Fig. 9 is a view in section on the line 9—9 of Fig. 7.

Figure 3:
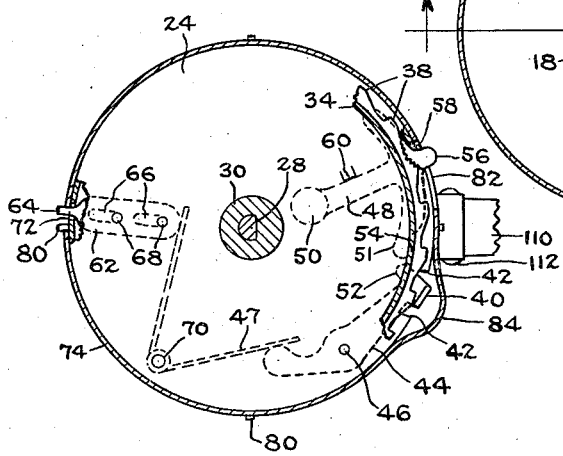
Fig. 3 is a view in section on the line 3—3 of Fig. 2.

The construction in general of the reel except for the brake mechanism may be the same as that disclosed in my Patent No. 1,964,998 and is so shown. The numeral 10 designates a shell or casing to the bottom of which seat members 12 are secured for attaching the reel to a fishing rod. Two opposite sides of the shell are provided with openings 14 for right and left hand use. The edges of these openings have stainless steel line guides 16 secured thereto in suitable manner as by crimping. The lower end of a main shaft 18 is rotatably mounted in a bearing formed at the bottom of the shell. The upper end of the shell 10 is open and is provided with a disk 24 the center of which has a bearing 26 through which the shaft 18 passes loosely. The upper portion of the shaft 18 above the bearing 26 is provided with a flat side 28 adapted to cooperate with a corresponding flat sided hole in a hub member 30 whereby the shaft and the hub member are caused to rotate together. The inner end of a main spring 32 is secured to the hub member while the outer end of this spring is secured to the inside of a drum or cap 34 the outer surface of which is milled or corrugated as indicated at 36 in order that the drum may be readily turned for winding the spring 32. The lower peripheral edge of the drum 34 is provided with outwardly extending ratchet teeth 38 with which a pawl tooth 40 is adapted to cooperate as shown in Fig. 3. The pawl tooth 40 extends upwardly through a notch 42 formed in the periphery of the disk 24 and is carried at one end of a lever 44 intermediately pivoted at 46 to the lower side of the disk 24. The pawl 40 is normally held in engagement with one of the ratchet teeth 38 by a V shaped spring 47 which at one end engages in a notch in the end of the lever 44 which is opposite the end thereof from which the tooth 40 is bent upwardly. A ratchet release arm 48 is pivoted at 50 to the underside of the disk 24. The arm 48 toward its outer end carries an arcuate member 51, one end of which normally engages against the end of the lever 44. When the pawl tooth 40 is moved outwardly from engagement with one of the ratchet teeth 38, the arm 48 may be given a slight turning movement so that a rounded projection 52 on the lever 44 engages in a rounded notch 54 formed in the arcuate member 51. In order to turn the arm 48, the outer end 56 thereof projects through a notch 58 formed in the upper margin of the shell 10. When the arm 48 is turned in the opposite direction, the projection 52 is caused to ride out of the notch 54 and the pawl tooth 40 is restored to operative engagement with the ratchet teeth 38 by the action of the spring 47. A stop 60 on the lower side of the disk 24 serves to limit the backward movement of the arm 48. The underside of the disk 24 also carries a slide 62, the outer end of which is provided with a locking pin 64. The slide 62 has two slots 66 which respectively receive two studs 68 secured in radial relation to the disk 24. The spring 47 previously referred to is anchored at its middle portion to a stud 70 carried by the disk 24, one end of this spring engaging a notch formed in the inner end of the slide 62 so that the pin 64 is normally held in outward position projecting through a hole 72 near the upper margin of the shell 10. The slots 66 are somewhat wider than the shanks of the studs 68 so that the pin 64 in addition to a radial movement is capable of a slight rocking movement which has an important purpose when the slide 62 is retracted to release the pin 64.

When the device is in assembled condition, the ratchet teeth 38 rest upon the upper surface of the disk 24. In order to hold the drum 34 for proper rotative movement upon the disk 24, a drum retaining ring 74 is provided, the upper end of this ring being beaded inwardly as indicated at 76 for engagement over the ratchet teeth 38. The lower margin of the ring 74 is provided with a number of bayonet slots 78 adapted to receive outwardly extending studs 80 carried near the upper margin of the shell 10 so that the ring may be secured to the shell by a slight turning movement. The ring 74 has a circumferential slot 82 adapted to register with the slot 58 and through which the end 56 of the arm 48 extends so as to be accessible to the operator. The ring 74 also has an outwardly struck boss 84 adjacent the notch 42 in the disk 24 which boss provides space for the pawl 40 to be moved outwardly from engagement with the ratchet teeth 38. This boss provides a covering for the pawl 40 and also permits making the drum 34 substantially the same diameter as the ring 74. It will be noted from Fig. 3 that the locking pin 64 when the device is assembled, is located adjacent one of the studs 80 so that it will enter the cooperating bayonet slot 78 and lock the ring 74 in place.

Figure 1:
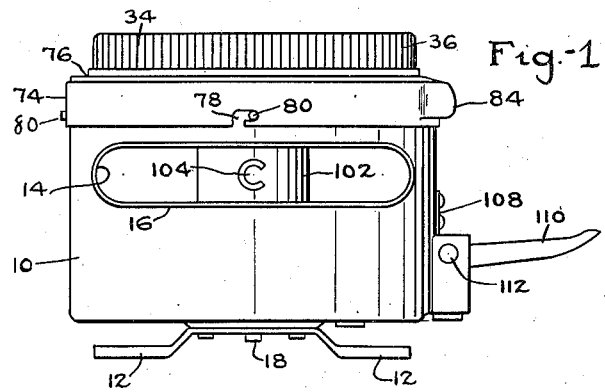
Figure 4:
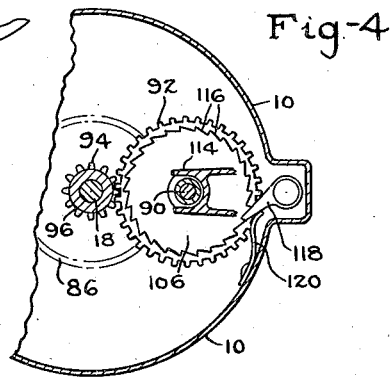
Fig. 4 is a view in section on the line 4—4 of Fig. 2.
Figure 2:
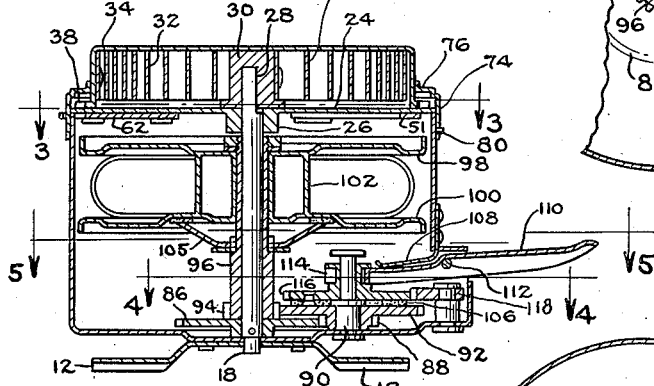
Fig. 2 is a view in central vertical section on line 2—2 of Fig. 5.
Figure 5:
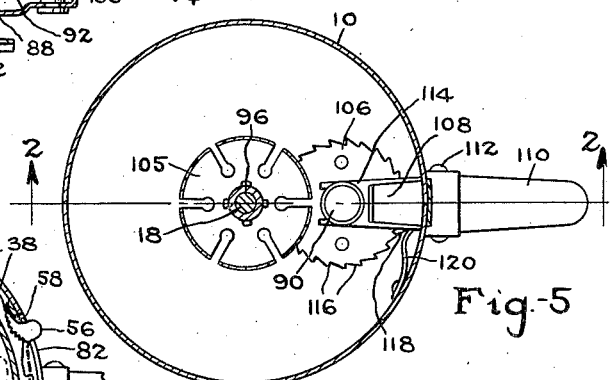
Fig. 5 is a view in section on the line 5—5 of Fig. 2.

As shown in Figs. 2 and 7, a primary gear 86 is secured to the lower end of the shaft 18 within the bottom of the shell 10, this gear meshing with a pinion 88 rotatable on an axis 90 carried by the bottom of the shell, this axis being designated 90' in Fig. 7. The pinion 88 is secured in concentric relation to an intermediate gear 92 which meshes with a pinion 94 secured to the lower end of a sleeve 96 rotatable on the shaft 18. The sleeve 96 is secured to the upper and lower heads 98 and 100 of a spool 102 having a tongue 104 to which the inner end of a fish line may be secured. The head 100 frictionally engages a spring disk 105 keyed on the sleeve 96. The construction thus far described is common to both forms of the invention.

Referring now to the form of invention shown in Figs. 1 to 5, it will be seen that a rotatable brake member 106 is rotatably mounted on the axis 90 in concentric relation to the rotatable member 92 and adapted to have sliding movement on said axis. The brake member 106 is normally held in contact with the rotatable member 92 by means of a spring 108 secured to the shell 10, it being noted that this spring bears upon a hand operable lever 110 pivoted at 112 to the casing 10. It is to be noted further that the inner end of the lever 110 is provided with a fork 114 which fits into a groove with which a hub carried by the brake member 106 is provided. The periphery of the brake member 106 is provided with ratchet teeth 116 adapted to be engaged by a pawl 118 backed up by a spring 120, the pawl and spring being carried by the shell 10. The ratchet device 116 and 118 prevents rotation of the brake member 106 in the direction to wind the line on the spool, but when the hand lever 110 is operated the brake member is removed from contact with the rotatable member 92, so that the tension of the motor spring 32 may cause the line to be wound on the spool.

Referring now to the form of invention shown in Figs. 6 to 9, it will be seen that a rotatable member 122 is keyed to the sleeve 96 so that it operates in connection with the driving means which is between the motor spring and the spool. The member 122 is adapted to cooperate with a rotatable brake member 124 mounted concentrically with relation thereto. I prefer to make the members 122 and 124 cone shaped as shown, although they might be made flat as shown for the members 92 and 106 in Fig. 2. The brake member 124 is rotatably carried by a hand operable lever 126 due to the fact that an enlarged open center portion 128 of the lever carries rollers 130 which engage in an annular groove formed around the periphery of the member 124. The lever 126 at its inner end is pivoted at 132 to one side of the casing 10 while a spring 134 attached at the other side of the casing normally holds the brake member 124 in contact with the rotatable member 122. The periphery of the brake member 124 is provided with ratchet teeth 136 adapted to be engaged by a pawl 138 which is held against the ratchet teeth 136 by a coiled spring 140. The ratchet device prevents rotation of the brake member in the direction to wind the line on the spool, but when the hand lever 126 is operated, the brake member 124 is removed from contact with the rotatable member 122 so that the tension of the motor spring 32 may cause the line to be wound on the spool.

The operation and advantages of my invention will be apparent in connection with the foregoing description and the accompanying drawings. The brake member 106 as shown in Fig. 2 or the brake member 124 in the form shown in Fig. 7 is normally held in contact with the rotatable member which member in the first form is the member 92 and in the second form is the member 122. The ratchet device normally prevents the brake member from rotating in the direction to wind the line on the spool. However, the ratchet device does not prevent rotation of the brake member in the opposite direction. Therefore the spool is free to rotate in the direction for paying out the line except for the resistance to such rotation offered by the motor spring 32, it being understood that this spring is being wound up as the line is running out. When the rotatable brake member is released by operation of the hand lever, the spring 32 rotates the spool to wind the line thereon.

In order to remove the drum 34 and the spring 32 attached thereto, the locking pin 64 is pressed inwardly through the shell and rocked over toward the adjacent stud 80 so as to engage the inner wall of the shell. The ring 74 may then be given a slight rotative movement to release it from the studs 80, whereupon the ring and drum may be removed separately from the shell. It will be noted that the pin 64 when it extends out through the hole in the shell also serves to hold the disk 24 in place on the shell and that when this pin is pushed in, the disk 24 is released so that it can be removed from the shell. This exposes the spool which can then be readily picked out from the shell for any desired purpose such as cleaning. It will be noted that this disassembling operation has no effect whatever upon the brake mechanism. In other words the rotatable brake member always maintains its concentric relation with the cooperating rotative member and is always in contact therewith except when this contact is removed by operation of the hand operable lever.

In order that the line may be wound on the spool, the inner end of the line is attached to the tongue 104 of the spool and the main spring is wound up by giving the drum 34 several turns. The brake lever is then depressed to wind the first portion of the line and these operations are repeated until the line is fully wound on the spool. The tension of the main spring is released and then the drum is given about two turns to provide the proper spring tension for casting. In order to release the spring tension, the drum is held in the palm of the hand and turned slightly to the right to force the pawl 40 outwardly, the ratchet release arm 48 at the same time being pressed to the right to place the pawl 40 in "off" position. The drum is then permitted to revolve slowly in the hand until the main spring is entirely unwound. This operation gives a free spool until the release arm 48 is pressed to the left to restore the pawl 40 to "on" position, whereupon turning of the drum the proper amount will again place the main spring under the desired tension.

I claim:

1. In a fishing reel, the combination of a line spool, a motor spring, driving means between said spring and spool, a rotatable member operating in connection with said driving means, a rotatable brake member concentrically mounted with relation to said rotatable member, means for preventing rotation of said brake member in the direction to wind the line on the spool, means normally holding said brake member in contact with said first rotatable member, and hand operable means for removing said contact.

2. In a fishing reel, the combination of a line spool, a motor spring, driving means between said spring and spool, a rotatable member operating in connection with said driving means, a rotatable brake member concentrically mounted with relation to said rotatable member, a ratchet device for preventing rotation of said brake member in the direction to wind the line on the spool, means normally holding said brake member in contact with said first rotatable member, and hand operable means for removing said contact.

3. In a fishing reel, the combination of a line spool, a motor spring, gears between said spring and spool adapted to cause said spring to wind the line on the spool, a rotatable member operating in connection with said gears, a rotatable brake member concentrically mounted with relation to said rotatable member, a ratchet device for preventing rotation of said brake member in the direction to wind the line on the spool, means normally holding said brake member in contact with said first rotatable member, and hand operable means for removing said contact.

4. In a fishing reel, the combination of a shell having an open end, a line spool supported in said shell, a motor spring, driving means between said spring and spool, a rotatable member operating in connection with said driving means, a rotatable brake member concentrically mounted with relation to said rotatable member, a ratchet device for preventing rotation of said brake member in the direction to wind the line on the spool, means normally holding said brake member in contact with said first rotatable member, hand operable means for removing said contact, and means for detachably mounting said motor spring on the open end of said shell to permit removal of said spring and spool from the shell without disturbing the brake mechanism.

5. In a fishing reel, the combination of a line spool, a motor spring, a train of gears connecting said spring with said spool, a rotatable member constituted by a face of an intermediate gear of said train, a rotatable brake member mounted for rotation in axial alinement with said first rotatable member so as to be concentric therewith, a ratchet device for preventing rotation of said brake member in the direction to wind the line on the spool, means normally holding said brake member in contact with said first rotatable member, and hand operable means for removing said contact.

6. In a fishing reel, the combination of a shell having an open end, a line spool supported in said shell, a motor spring, a train of gears connecting said spring with said spool, a rotatable member constituted by a face of an intermediate gear of said train, an axis carried by said shell upon which said rotatable member is mounted, a rotatable brake member mounted for rotation on said axis so as to be concentric with said first rotatable member, said brake member having peripheral ratchet teeth, a pawl attached to said shell for engagement with said teeth for preventing rotation of said brake member in the direction to wind the line on the spool, means normally holding said brake member in contact with said first rotatable member, and a hand operable lever intermediately pivoted to said shell for lifting said brake member from said contact.

7. In a fishing reel, the combination of a line spool, a motor spring, a shaft adapted to be turned by said spring, a sleeve secured to said spool and rotatably mounted on said shaft, a train of gears between said shaft and sleeve, a rotatable member secured to said sleeve, a rotatable brake member concentrically mounted with relation to said rotatable member, means for preventing rotation of said brake member in the direction to wind the line on the spool, means normally holding said brake member in contact with said first rotatable member, and a hand operable lever for removing said contact.

8. In a fishing reel, the combination of a shell, having an open end, a line spool supported in said shell, a motor spring, a shaft adapted to be turned by said spring, a sleeve secured to said spool and rotatably mounted on said shaft, a train of gears between said shaft and sleeve, a rotatable member secured to said sleeve, a rotatable brake member concentrically mounted with relation to said rotatable member, said brake member having peripheral ratchet teeth, a pawl attached to said shell for engagement with said teeth for preventing rotation of said brake member in the direction to wind the line on the spool, means normally holding said brake member in contact with said first rotatable member, and a hand operable lever pivoted to said shell and which rotatably carries said brake member and which when operated removes said contact.

9. In a fishing reel, the combination of a line spool, a motor spring, a shaft adapted to be turned by said spring, a sleeve secured to said spool and rotatably mounted on said shaft, a train of gears between said shaft and sleeve, a rotatable cone shaped member secured to said sleeve, a rotatable cone shaped brake member concentrically mounted with relation to said rotatable member, a ratchet device for preventing rotation of said brake member in the direction to wind the line on the spool, means normally holding said brake member in contact with said first cone shaped member, and a hand operable lever for removing said contact.

EMMETT B. PERRINE.